United States Patent [19]

Nakakuki et al.

[11] Patent Number: 4,919,513
[45] Date of Patent: Apr. 24, 1990

[54] PLASTIC OPTICAL FIBER

[75] Inventors: Noboru Nakakuki; Kazuhide Oda; Masatoshi Tagami; Kouichi Okino; Tomiya Abe; Takanobu Ishibashi, all of Ibaraki, Japan

[73] Assignee: Hitachi Cable, Ltd., Tokyo, Japan

[21] Appl. No.: 266,707

[22] Filed: Nov. 3, 1988

[30] Foreign Application Priority Data

Mar. 9, 1988 [JP] Japan .................................. 63-55605

[51] Int. Cl.⁵ .............................................. G02B 6/22
[52] U.S. Cl. ................................................. 350/96.33
[58] Field of Search ............... 350/96.30, 96.31, 96.32, 350/96.33, 96.34

[56] References Cited

U.S. PATENT DOCUMENTS

| | | | |
|---|---|---|---|
| 3,549,233 | 9/1967 | Eaglesfield et al. | 350/96.33 |
| 3,718,383 | 2/1973 | Moore | 350/96.33 X |
| 3,808,549 | 4/1974 | Maurer | 350/96.33 X |
| 3,980,390 | 9/1976 | Yamamoto et al. | 350/96.33 |
| 4,206,967 | 6/1980 | Onoda et al. | 350/96.33 |
| 4,458,986 | 7/1984 | Yuto et al. | 350/96.33 |
| 4,733,941 | 3/1988 | Broer et al. | 350/96.33 |
| 4,768,860 | 9/1988 | Tatsukami et al. | 350/96.33 X |

FOREIGN PATENT DOCUMENTS 045502 3/1982 Japan .

Primary Examiner—William L. Sikes
Assistant Examiner—Phan T. Heartney
Attorney, Agent, or Firm—Lowe, Price, LeBlanc, Becker & Shur

[57] ABSTRACT

An improved plastic optical fiber and a process for fabricating the same are disclosed. The plastic optical fiber comprises a core and a cladding is formed around the core that has a lower refractive index than that of the core. The cladding consists of an inner transparent cladding and an outer colored, opaque cladding. These inner and outer claddings are formed to be bonded together by simultaneous extrusion thereof.

5 Claims, 2 Drawing Sheets

PLASTIC OPTICAL FIBER

FIELD OF THE INVENTION

This invention relates to a plastic optical fiber and, more particularly, to a heat resistant plastic optical fiber comprising a plastic core and a cladding formed around the core.

BACKGROUND OF THE INVENTION

With the remarkable development of silica optical fibers, a light transmission systems using optical fibers have lately been put to practical use. Plastic optical fibers show a relatively large loss in light transmission (about 1 dB/m), compared with that of silica optical fibers occupying the mainstream of the present light communication developments. However, the plastic optical fiber is very flexible and relatively soft, may have a large aperture, and can easily be handled, and thus it may be expected that this plastic optical fiber will be applied to such short distance communication as in an automobile, office and factory automations, and the like.

Polymethacrylate resin or polystyrene resin having an improved optical property is used for the present plastic optical fibers. However, these resins have a relatively low thermal deformation temperature and thus it has been desired to improve its thermal resistance in various fields, including the automobile industry. Accordingly, an investigation of thermal resistant plastic optical fibers has lately been carried out.

Conventional plastic optical fibers have a core comprising acrylic, styrene or silicone thermosetting resin having an improved thermal resistance, and a cladding comprising fluororesin and the like having improved thermal resistance and a lower refractive index than that of the core.

In such a thermal resistant, plastic optical fiber, the resin precursor (monomer) used for the core is liquid at room temperature, and thus it is difficult to form a fibrous core by itself from this liquid monomer; as the temperature to process a fluororesin material is higher than 200°C., it is difficult to extrude the fluororesin material around the core for its cladding. In order to solve these problems, Japanese Laid Open Patent Publn. No. 45502/82, for example, discloses the following method of making a plastic optical fiber. This method comprises extruding a resin material to form a hollow clad tube, injecting a liquid monomer material used for a core from a tank into the resulting clad tube, sealing off the leading end of the clad tube, and gradually passing the tube containing the monomer under pressure through a hot water bath to cure the monomer from its leading portion to its rear end to provide a plastic optical fiber without separation of the interface between the core and the clad tube.

Regarding the characteristics of the optical fiber, it is the most important to minimize the transmission loss of light.

Low-loss, visible light is used in the transmission of light by means of the plastic optical fiber. However, this visible light will result in the following problem: as the two layered types of plastic optical fiber described above has a transparent clad layer, external visible light can intrude into the transparent clad layer and this can result in transmission loss.

In order to solve this problem, a structure to prevent the intrusion of the external visible light by coloring such a clad layer has been proposed. However, a portion of the transmitted light is absorbed by the colored clad layer, causing transmission loss.

As described above, such a two layered type of plastic optical fiber comprising a core and a cladding has the problem of such transmission loss even if transparent or a colored layer is used as the clad layer. As one of the means to solve these both problems, the method for extruding a colored sheath around the transparent clad layer to form a plastic optical fiber has been proposed so as to prevent the intrusion of the external light and the absorption of light by the transparent clad layer.

However, the plastic optical fiber having such a sheath around the clad layer has various problems and is very difficult to put to practical use.

That is, as described above, when the liquid monomer used for a core is polymerized within the clad tube, it is required to supply the liquid monomer to the clad tube under pressure by considering the volume contraction of the liquid monomer upon polymerization and thus, it is impossible to make a very thin clad tube and the further step of sheathing would provide an optical fiber having an oversized outside diameter. This oversized diameter is undesirable with respect to the characteristics and use of the resulting optical fibers.

In addition, such a sheath around the preformed plastic optical fiber results in a thermal strain between the core and clad layer, and between the clad layer and the sheath due to thermal hysteresis, and thus a high transmission loss (about 2-3 dB/m).

When the sheath is first extruded around the clad tube to form a sheathed clad tube, then the monomer for the core is injected into the sheathed clad tube and the injected monomer is heated for polymerization, the resulting product has poor adhesion between the clad tube and the sheath and thus a low transmission efficiency.

As described above, in either case where the resin material for the core is polymerized using the product obtained by sheathing of the preformed plastic optical fiber of sheathing of the clad tube, the resulting products have undesirable transmission characteristics. Furthermore, when a thermodynamic cycle is applied to these plastic optical fibers, both of them show the so-called "shrink back" (this term means that the clad layer protrudes from the sheath due to the poor adhesion between them), and thus an undesired transmission loss. The plastic optical fiber is generally used with a connector at its end portion and thus its high transmission loss is caused by this "shrink back".

SUMMARY OF THE INVENTION

Accordingly, it is an object of the invention to provide a plastic optical fiber in which thermal strain developed in the process of its production and shrink back caused by heat cycling can be prevented, and a process for fabricating the same.

It is a further object of the invention to provide a plastic optical fiber of low light transmission loss and a process for fabricating the same, by which the transmission loss due to an intrusion of the external light, absorption of light, etc., can be minimized.

According to one aspect of the invention, the cladding or clad layer of the plastic optical fiber comprises a transparent inner cladding and a colored opaque outer cladding, both of which are bonded and unified with each other.

According to a further feature of the invention, a process for fabricating a plastic optical fiber comprises the steps of extruding a first resin material through a first orifice between a nipple and an inner die to form a tube-shaped inner cladding, and simultaneously extruding a second resin material through a second orifice between said inner die and an outer die onto the outer periphery of said tube-shaped inner cladding concentrically to form an outer tube-shaped cladding, thereby providing an integral clad tube in which said inner and outer tube-shaped claddings are bonded, said second resin material being compatible with said first resin material and containing a coloring agent, injecting and filling a resin precusor used for a core into a hollow portion of said integral clad tube from one end thereof, and sealing off the other end of said clad tube, and gradually heating said clad tube from said sealed off end, while applying pressure to said resin precusor to polymerize said resin precusor.

BRIEF DESCRIPTION OF DRAWINGS

The invention will be explained in conjunction with the appended drawing, wherein.

DESCRIPTION OF THE PREFERRED EMBODIMENTS

Figure 1:
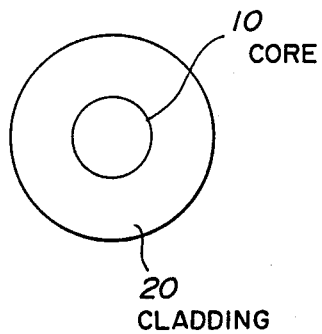
FIG. 1 is a cross-sectional view showing a conventional plastic optical fiber.
Figure 2:
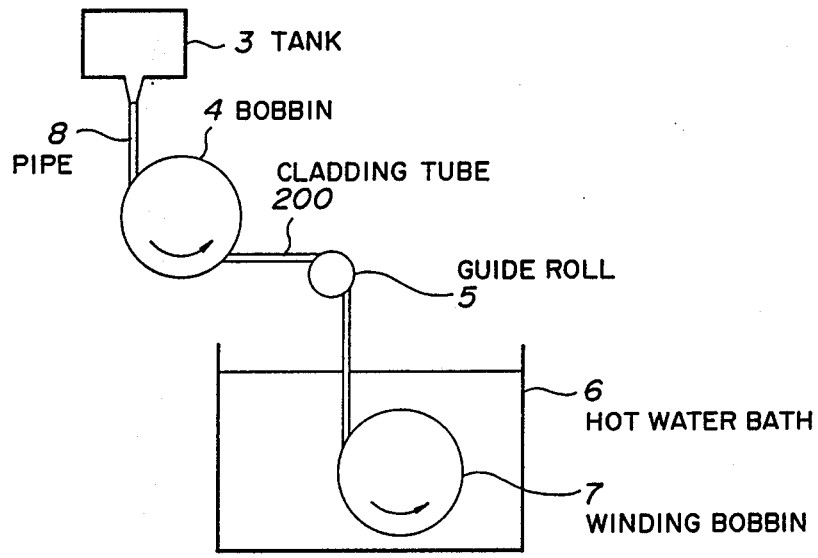
FIG. 2 is an explanatory diagram showing a process for fabricating a plastic optical fiber in which a conventional plastic fiber and a plastic optical fiber according to the invention are fabricated.

Before explaining a plastic optical fiber and a process for fabricating the same according to the invention, the aforementioned conventional plastic optical fiber and the aforementioned conventional process for fabricating the same are explained in FIGS. 1 and 2.

FIG. 1 shows a conventional plastic optical fiber comprising a core 10 consisting of thermosetting resin such as acrylic, styrene or silicone resin having an improved thermal resistance, and a cladding 20 that has a refractive index lower than that of the core as well as an improved thermal resistance.

FIG. 2 shows a process for fabricating a conventional plastic optical fiber. In this process, the resin used for a cladding is extruded to form a hollow clad tube 200, the liquid monomer for the core is injected from an opening of a first end of tube 200 into the hollow tube 200 through a pipe 8 connected to a tank 3 and the other end of the hollow tube is sealed off. The clad tube 200 in such a monomer-supplied situation, under pressure, is passed through a hot water bath 6 to gradually cure the monomer within the clad tube 200 from the other end thereof thereby providing a plastic optical fiber free from the separation at the interface between the core and the cladding. Numeral 4 represents a bobbin used for winding up and winding off of the clad tube 200, and 5 and 7 represent a guide roll and a bobbin used for winding up a clad tube, respectively.

Figure 3:
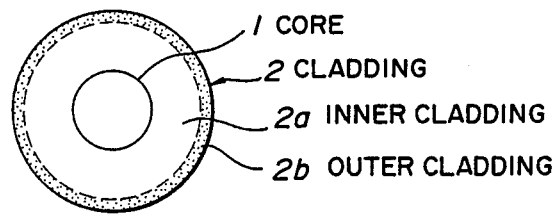
FIG. 3 is a cross sectional view showing a plastic optical fiber in an a preferred embodiment according to the invention.

Next, a plastic optical fiber in an embodiment according to the invention is explained in FIG. 3. In FIG. 3, a cladding 2 is provided around a transparent core 1, and this cladding 2 comprises a transparent inner cladding 2a and a colored, opaque outer cladding 2b, an interface of which is bonded and united. However, this plastic optical fiber is formed by injecting a liquid monomer into a core region 1 of a previously formed tube-shaped cladding or clad tube 2 and then polymerizing the monomer.

Because such a cladding or clad tube 2 consists of a transparent inner cladding 2a and a colored, opaque outer cladding 2a, visible light from the outside can be shut out by the outer cladding 2b to minimize the transmission loss, and because the transparent inner cladding 2a is provided just over the core 1, the extinction of light propagating through the fiber can be almost completely prevented, compared with the case where a colored cladding is provided just over the core 1.

Furthermore, since the inner cladding 2a and the outer cladding 2b are bonded and united with each other, the transmission loss due to thermal strain, transmission loss due to the poor adherence between a cladding and a sheath, and transmission loss due to "shrink back" upon subjection to a heat cycle, which are observed in a conventional plastic optical fiber comprising a conventional cladding and a colored sheath provided on an outer periphery of the cladding by extrusion, can be minimized or completely prevented to provide improved light transmission characteristics.

As the resin used for the core 1, a thermosetting resin material having an excellent thermal resistance is preferable, and exemplary thereof are acrylic, styrene or silicone resins which are stable at temperatures higher than 150°C. However, it is not limited to these resins. Further, a thermoplastic resin material may be used in a case where such thermal resistance is not particularly required.

The preferred inner cladding will be of those materials having a refractive index of at least 1%, preferably, 3% or more lower than that of the core, and also includes those materials which have improved thermal resistance, chemical resistance, and pressure resistance which can sufficiently withstand against the pressure of the supply of monomer used for the core, and have improved mechanical properties, e.g., fluororesin. More specifically, such a material includes polyvinyl fluoride (PVF), polyvinylidene fluoride (PVDF), ethylene-tetrafluoroethylene copolymer (ETFE), tetrafluoroethyleneperfluoropropylene copolymer (FEP), perfluoroalkylether copolymer (PFA), polytetrafluoroethylene (PTFE), or chlorotrifluoroethyle-ethyene copolymer, tetrafluoroethylene-hexafluoroethylene copolymer, tetrafluoroethylene-perfluoroalkylvinylether copolymer, poly (4-methyl-pentene), etc., and mixtures thereof.

Preferably, the outer cladding 2b is formed of the same material as that of the inner cladding 2. It is preferable to use the same kind of materials, i.e., having a good mutual solubility between them.

The coloring agent blended into the outer cladding material 2b is commonly used material such as carbon black or the like, and is not limited to a particular material.

Preferably, the inner cladding is as thick as possible, while the outer cladding is as thin as possible, and the thickness of the outer cladding is preferably about 1/8-1/5 time that of the inner cladding.

A process for fabricating a plastic optical fiber according to the invention is explained hereinafter. The present inventive plastic optical fiber is basically compatible with a conventional plastic optical fiber from the viewpoint of pressure-supplying the liquid monomer such as resin precusor for forming the core into a clad tube made in a separate step, and heating them for polymerization. However, the present invention differs from the conventional methods in the process for making such a clad tube. That is, as described above, the cladding or clad tube 2 according to the present invention is required to be unified by melting and bonding an interface between inner cladding 2a and the outer cladding 2b. The conventional method of covering a preformed inner tube 2a with the outer cladding 2b can provide a product with a closely contacted interface, but can not provide a product with such a unified interface.

Figure 4:
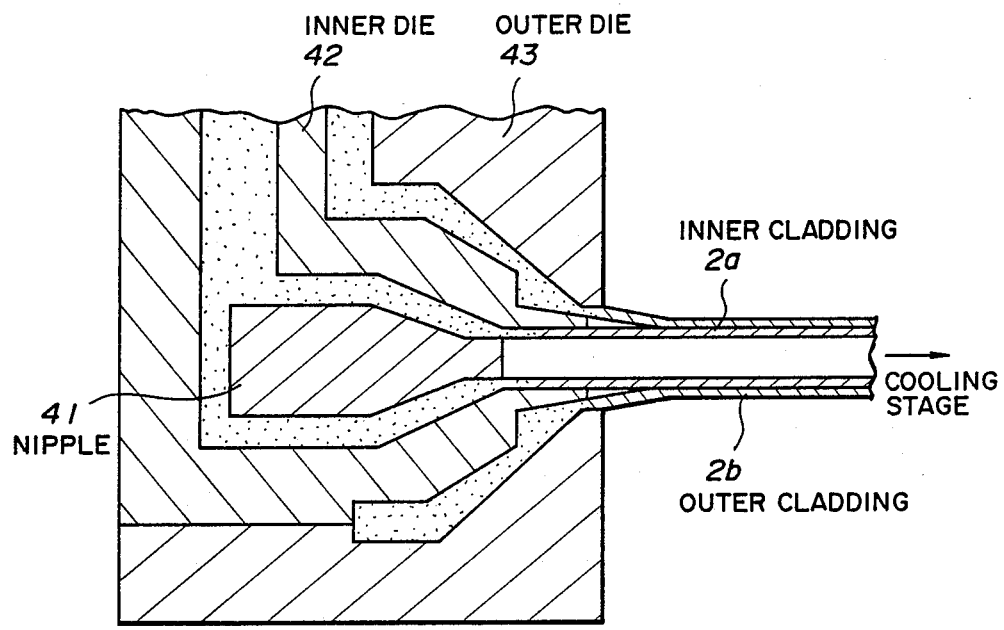
FIG. 4 is a partial cross sectional view illustrating an extruder for extruding a cladding tube applied to a plastic optical fiber of the invention.

Accordingly, as shown in FIG. 4, the present invention solves this disadvantage of the conventional method by extruding a resin material through the orifice between a nipple 41 and an inner die 42 to produce a continuously formed inner cladding 2a in the shape of hollow pipe, and simultaneously, extruding another coloring agent blended resin material through the orifice between an inner die 42 and an outer die 43 around the outer surface of the hollow inner cladding 2a. Such a simultaneous extrusion of two claddings or layers can provide a unified or integral clad tube in which the interface between the inner and outer claddings 2a and 2b is melted and bonded prior to curing such resin materials, provided that the resin for the inner cladding 2a and the resin for the outer cladding 2b comprise the same material or the same kind of material are therefore easily bonded each other.

Figure 5:
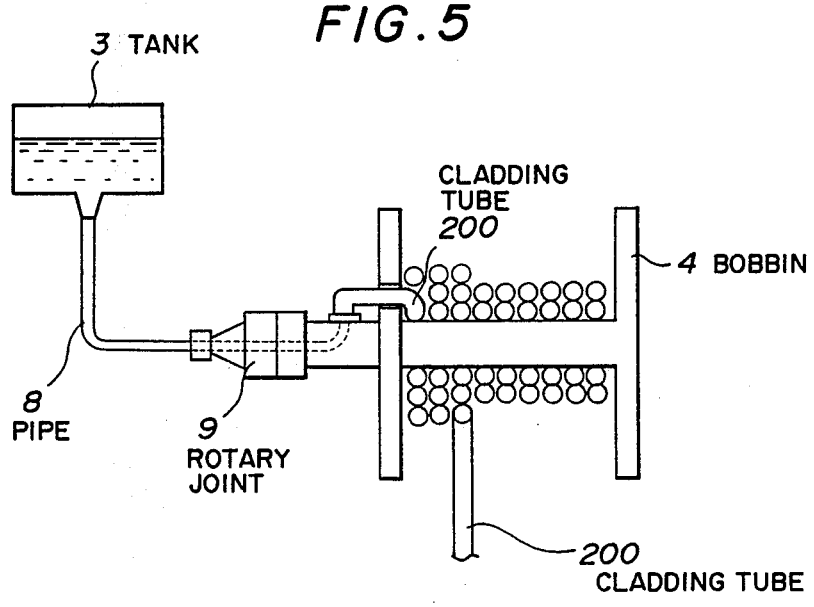
FIG. 5 is an explanatory diagram illustrating a process for fabricating a plastic optical fiber and more particularly, the process of winding up and winding off of the clad tube prior to polymerization.

Then, according to the process for fabricating a plastic optical fiber shown in FIG. 2 and 5, the resulting clad tube 200 is wound up around a bobbin 4, and a liquid monomer material containing a polymerization initiator is charged into the clad tube 200 by supplying the monomer material to an opening at one of its ends under pressure.

As shown in FIG. 5, such a liquid monomer material, under pressure may be supplied through a pipe connected to a tank 3 and a rotary joint 9 into one opening of the clad tube 200 wound up around the bobbin 4 and having its leading opening shut off. The liquid monomer charged clad tube 200 is wound off from its leading end, and is sent through a guide roll 5 and a hot water bath 6 to a bobbin 7. The liquid monomer material within the clad tube 200 passed through the hot water bath 6 is gradually polymerized from its leading end, with a contraction of the volume thereof. However, due to supply of the liquid monomer material under pressure, a plastic optical fiber having an improved adherence between the core and the clad tube 200 can be obtained without bubbles and the like. In addition, the separation between the inner cladding and the outer cladding upon polymerization of the core, and the shrink back upon heat cycling is completely prevented due to bonding between the inner and outer claddings. Further, it is not required to provide a sheath on this plastic optical fiber and, thus, a core free from thermal strain can be obtained, resulting in an improved plastic optical fiber having a low transmission loss.

In this embodiment, the hot water bath 6 is used for heating a monomer material, but it is not to be construed as limiting the invention, and a heating furnace can also be used instead of it. Further, although the thermosetting resin material which is difficult to extrude as a core material has been described hitherto, a plastic optical fiber having improved mechanical property and transmission characteristics can also be obtained even with a thermoplastic resin material, provided that its thermal resistance is somewhat reduced compared with the thermosetting resin material.

The following examples are presented to further illustrate the present invention, but are not to be construed as limiting the invention.

EXAMPLE 1

Tetrafluoroethylene-perfluoropropylene resin (sold as FEP, NP-20 by Daikin K.K.) is used as a cladding material.

The resin material (FEP) was extruded through an orifice between a nipple 41 and an inner die 42 to form a tube-shaped inner cladding 2a having an outer diameter of 1.6mm and a thickness of 0.3mm, and simultaneously another resin material containing a 5 wt % of carbon black was extruded through an orifice between the inner die 42 and an outer die 43 around the tube-shaped inner cladding 2a to form an outer cladding 2b having an outer diameter of 1.8mm and a thickness of 0.1mm using a two-layer simultaneous extrusion type of extruder. The result was an integral clad tube or cladding 2, in which the inner and outer tube-shaped claddings 2a and 2b are bonded at their interface, with an outer diameter of 1.8mm and a thickness of 0.4mm.

On the other hand, a monomer composition comprising 70 wt% of methacrylate, 10 wt % of ethylene glycol dimethacrylate and 20 wt % of n-butyl acrylate was used as a core material, and 0.5 wt % of benzoyl peroxide was used as a polymerization initiator. This monomer composition was charged into the above-described integral clad tube, the leading end thereof was sealed off, and while applying a pressure of 10 kg/cm$^2$ to the monomer composition, the sealed off clad tube was, from its leading end, passed through a hot water bath 6 kept at 80°C. with a winding speed of 5 cm/min to cure the monomer composition filled in the clad tube from its leading end successively. The resulting plastic optical fiber showed the following improved characteristics: there are no bubbles in the core; there is no separations between the core and the inner cladding and between the inner cladding and there is the outer cladding; and good light transmittance. The heat cycle test of this plastic optical fiber by which 50 repeats of a heat cycle of—50°C.×1 hr to 150°C.×1 hr were applied to the fiber of 1m length, showed no shrink-back.

EXAMPLE 2

In order to making a plastic optical fiber, the procedure described in Example 1 was repeated except that PFA resin was used as an outer cladding material. The resulting plastic optical fiber was free from bubbles in the core region, had no separation between respective layers and had improved light transmittance, and did not show "shrink back" even when the same heat cycle was applied as that of Example 1 to the fiber.

COMPARATIVE EXAMPLE

In order to making a plastic fiber, the procedure described in Example 1 was repeated except that an inner cladding tube was first extruded, and then an outer cladding tube was extruded around the resulting inner cladding tube. The resulting plastic optical fiber was free from bubbles in the core and had no separation between the core and the inner clad tube. However, because the inner cladding was not bonded to the outer cladding, the outer clad-portion of the clad tube contracted and thus the core and the inner cladding protruded 3mm from the outer cladding portion.

As described above, the plastic optical fiber according to the invention shows the following remarkable effects.

As the resulting cladding or clad tube comprises a transparent inner clad layer bonded together with a colored opaque outer clad layer, the intrusion of external visible light can be prevented, the absorption of light by the inner clad layer can be eliminated, and the transmission characteristics can be improved. Further, as thermal strain is applied to their respective interfaces, and the separation between the outer and inner clad layers caused by thermal hysteresis and the shrink back due to heat cycle are eliminated, compared with the conventional optical plastic fiber comprising a colored sheath provided around a transparent cladding, the transmission loss caused by these structural defects can be prevented.

The plastic optical fiber having such improved characteristics without the above-mentioned thermal strain between their respective clad layers, separation and shrink back can be obtained by extruding both inner and outer clad layers simultaneously to form an integral clad tube, then supplying a liquid monomer material for forming the core into the clad tube under pressure and polymerizing the monomer material.

The preferred embodiment of the present invention has been disclosed by way of examples and it will be understood that other modifications may occur to those skilled in the art without departing from the scope and the spirit of the appended claims.

What is claimed is:

1. A plastic optical fiber, comprising:
   a core comprising a transparent resin material having a predetermined refractive index; and
   a cladding, formed on an outer periphery of said core, comprising a heat resistant resin material having a lower refractive index than that of said core, wherein said cladding comprises a transparent inner cladding and a colored, opaque outer cladding, said inner and outer claddings being bonded and unified with each other at an interface and
   wherein said inner and outer claddings comprise resin materials of the same kind, which can be bonded to each other and are formed to have an integral tube-shaped form generated by simultaneous extrusion thereof.

2. A plastic optical fiber, comprising:
   a transparent core of a thermosetting resin having a first refractive index;
   a transparent inner cladding layer of a first thermoplastic resin formed on the outer periphery of said core and having a second refractive index which is lower than said first refractive index;
   a non-transparent outer cladding layer of a second thermoplastic resin including a coloring and opaque material, formed on the outer periphery of said inner cladding layer and having a third refractive index which is lower than said first refractive index, said inner and outer cladding layers being formed by simultaneous extrusion of said first and second thermoplastic resins to provide a composite cladding tube having a firmly unified interface between said inner and outer cladding layers with said core being formed by pressure-charging of said thermosetting resin in liquidized form into said composite cladding tube and polymerization thereafter of said thermosetting resin in the same composite cladding tube.

3. A plastic optical fiber according to claim 2, wherein:
   said inner and outer cladding layers of said first and second thermoplastic resins comprise the same kind of thermoplastic resin.

4. A plastic optical fiber according to claim 2, wherein:
   a ratio of the thickness of said outer cladding to the thickness of said inner cladding is about ⅓ to 1/5.

5. A plastic optical fiber according to claim 3, wherein:
   a ratio of the thickness of said outer cladding to the thickness of said inner cladding is about ⅓ to 1/5.

* * * * *